United States Patent [19]
Aldcroft et al.

[11] 3,954,944
[45] May 4, 1976

[54] FINE SILICAS
[75] Inventors: Derek Aldcroft, Wirral; Donald Barby, Great Barrow; Anthony Leonard Lovell, Wirral; James Philip Quinn, Birkenhead, all of England
[73] Assignee: Joseph Crosfield & Sons, Ltd., Warrington, England
[22] Filed: Mar. 8, 1973
[21] Appl. No.: 339,087

[52] U.S. Cl. .................................. 423/335; 423/339
[51] Int. Cl.² ........................................ C01B 33/12
[58] Field of Search ................... 423/339, 335, 338; 252/449

[56] References Cited
UNITED STATES PATENTS

| | | | |
|---|---|---|---|
| 3,325,249 | 6/1967 | Burke, Jr. | 423/339 |
| 3,574,135 | 4/1971 | Sampson et al. | 423/339 X |
| 3,798,174 | 3/1974 | Acker et al. | 423/339 X |

FOREIGN PATENTS OR APPLICATIONS

| | | | |
|---|---|---|---|
| 1,145,510 | 1969 | United Kingdom | 423/335 |

Primary Examiner—R. Dean
Assistant Examiner—Michael L. Lewis
Attorney, Agent, or Firm—Kaufman & Kramer

[57] ABSTRACT

This invention discloses a new form of wet precipitated silica which is characterised in terms of energy required to breakdown particles and a defined thickening effect. A multistage precipitation and flocculation production process is also disclosed in which primary silica particles are prepared and flocculated using an alkali metal salt solution and further silica precipitated in the presence of the salt, the pH of the mixture reduced and the silica isolated, purified carefully dried and optionally milled.

2 Claims, 1 Drawing Figure

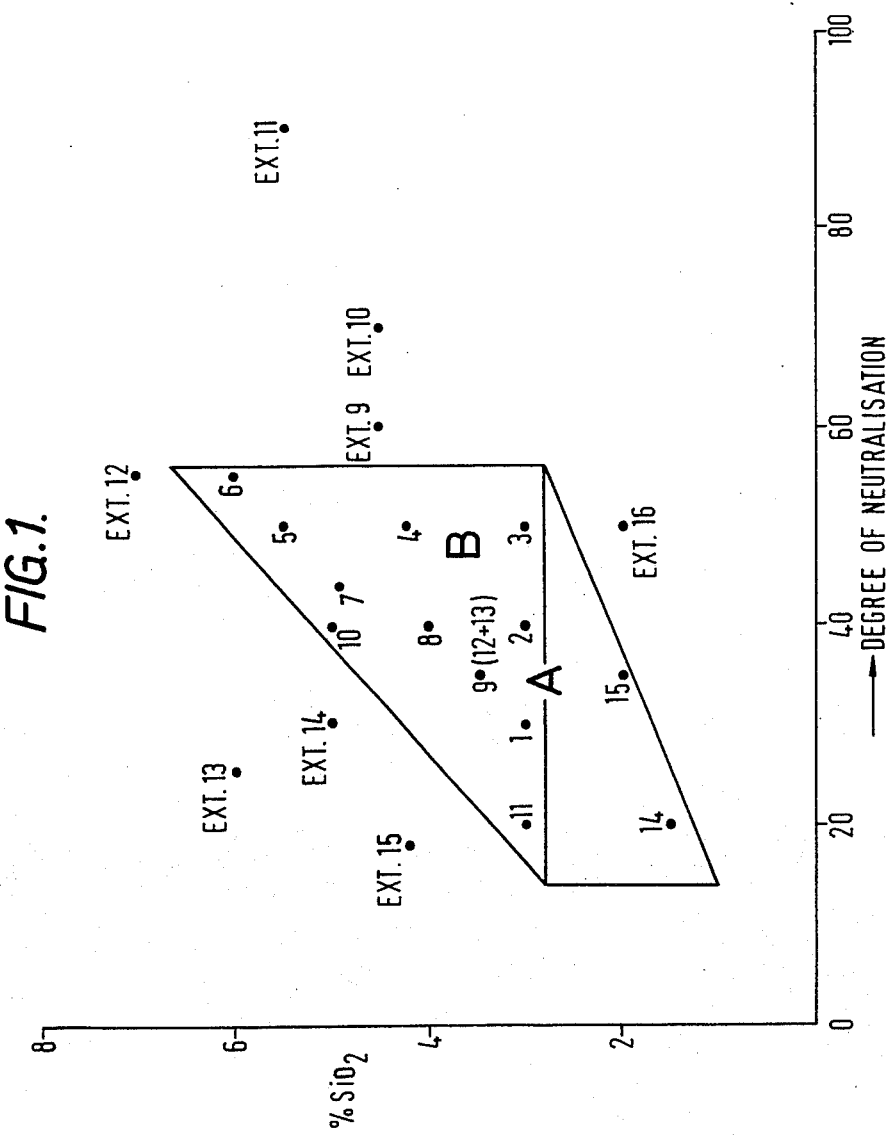

FINE SILICAS

BACKGROUND OF THE INVENTION

This invention relates to precipitated silicas. More particularly, the invention provides a new form of silica which can be produced by wet methods, and which has properties which on a cost/effectiveness basis, are comparable with or better than the very expensive pyrogenic silica produced by methods such as burning silicon tetrachloride.

THE PRIOR ART

Pyrogenic silica has, for many years, been used as a rubber filler and as a thixotrope and has commanded a premium price in view of its outstandingly good properties in these and other uses. Workers have, over these many years, attempted to produce, cheaply, silicas having properties comparable, or at least only marginally inferior, to the pyrogenic silica by such expedients as mixing pyrogenic silica with silicas produced by other methods, by the use of a plasma arc to vaporise silica which is then condensed to form fine particles, see, for example British Specifications Nos. 1,211,702 and 1,211,703 and by supercritical removal of liquid from pores of silica gels. British Specification No. 1,145,510 teaches the fluid energy milling of precipitated silicas to enhance their thixotropic properties but the silicas so produced are demonstrably inferior to those provided by the present invention.

As far back as 1951, Iler in a specification published as U.S. Pat. No. 2,731,326 suggested a two-stage process for the preparation of a precipitated silica useful as a filler for rubber and also as a thickening agent for greases. His silica was also stated to be useful as a carrier for insecticides and as a catalyst.

In the Iler process (U.S. Pat. No. 2,731,326), at Example 11 which is similar to one process of the present invention, primary silica particles are produced by reacting together sodium silicate and sulphuric acid at a temperature of 95°C, the amount of acid being used being equivalent to about 80% of the $Na_2O$ in the original sodium silicate. The sol obtained is maintained at 95°C and then secondary of "active" silica precipitated. The secondary silica is prepared by adding sodium silicate solution and sulphuric acid to the sol over a period of 2 hours. This secondary silica is then stated to accrete onto the primary particles to cement them together so forming the "reinforced silica xerogels", which at Column 8, Iler points out are the products of his invention and are characterised by showing a decrease in specific surface area during their formation which Iler suggests is due to the secondary silica precipitating onto the aggregates and increasing the weight of the aggregates more rapidly than their surface area.

Although in fact, certain of the process steps in one route to this new silica are similar to the Iler proposals, the process and resultant product do clearly avoid the substantially reinforced aggregates state spelt out in Column 5 of the Iler specification as shown later in Table II.

FIELD OF THE INVENTION

Studies have been made of the structure of pyrogenic silica and it has been concluded that this structure is so different from that of precipitated silicas made hitherto that it is not surprising that the properties, particularly the thixotropic properties are not comparable. Attempts have, therefore, been made to make a precipitated silica which has a morphology more similar to pyrogenic silica and the new precipitated silica which has now been produced has this similar morphology. From experimental work it would appear likely that the new silica provided by the present invention possesses both the appropriate inherent chain-like morphology and the ability to break down to permit the utilisation of this morphology. These two characteristics are demonstrated later in terms of performance index of fluid energy milled silica and "breakdown energy" required to reduce the average particle size of the dried silica.

In broad outline, one process for the preparation of this new form of silica comprises preparing primary silica particles by reacting together at a temperature between 85°C and the boiling point, an aqueous solution of sodium silicate and an acid to partially neutralise the silicate solution, adding to the primary precipitated silica an electrolyte to prevent further growth of primary silica and also to flocculate the sol to give an open, chain-like structure which is thought likely to be the foundation of the ultimate pyrogenic silica-like morphology and hence for the thixotropic properties of the final product. After the flocculation stage further silica is produced in the mixture by addition of more acid or more acid and silicate, causing the growth of secondary silica particles to a size limited by the electrolyte concentration and thus producing a product comprising primary silica particle aggregates surrounded by secondary silica particles. These secondary particles presumably serve to isolate the aggregates from each other during the filtration and drying steps and prevent the precipitated silica from losing the ability to form the open structure similar in morphology to that of pyrogenic silica.

The drying step is critical in that it determines the bonding between the silica particles. It is well known that if wet silica particles are dried in contact with each other, the probability of forming strong siloxane bonds is increased and this is undesirable for the production of the silicas of this invention. Hence, if a drying technique is employed in which some material passes more than once through the dryer or the material is otherwise re-wetted and dried then the possibility of additional siloxane bonds being formed is increased and stronger particles so formed. These stronger particles cannot so easily be broken down and thus the open structure is largely lost.

The use of a spray dryer to carry out the drying is particularly advantageous. A spray dryer therefore constitutes a preferred one-pass drying system for achieving drying with minimal aggregation and bonding of particles.

In some applications the technique of incorporating the silica into the final product, be it a plastics film or a synthetic resin or a synthetic rubber will involve a sufficient energy input so that no separate milling step is necessary.

SUMMARY OF THE INVENTION

Accordingly, the present invention provides a precipitated silica having an ignition weight loss of at least 3% between 120°C and 1000°C and a strength such that a sample of the silica having a weight mean particle size on a substantially unimodal distribution in the size range 10–20 microns requires less than 6500 joules of ultrasonic energy as hereinafter defined to reduce the weight mean particle size of the sample to below 3 microns and which silica, after fluid energy milling, has a performance index as hereinafter defined of at least 7.

This invention also provides a milled precipitated silica having an ignition weight loss of at least 3% between 120°C and 1000°C and a particle size distribution such that at least 30% by weight is less than 0.2 microns and a performance index greater than 7.

The precipitated silica provided by this invention may be made by various processes.

Accordingly one process for preparing the silica of this invention comprises preparing primary silica particles by reacting at a temperature between 85°C and the boiling point, an aqueous alkali metal silicate solution and an acid to a degree of neutralisation and $SiO_2$ concentration as indicated by area A, preferably area B in FIG. 1 of the accompanying drawings, flocculating the silica by the addition of an effective amount of an alkali metal salt, precipitating further silica in the presence of the salt, reducing the pH of the mixture to below 7, isolating the silica so produced and subjecting the silica to purification and single pass drying.

Preferably the further silica is precipitated by the addition of acid which causes precipitation of silica from the alkali metal silicate solution.

Preferably the alkali metal salt is sodium chloride added as a solution to produce a mixture containing 0.3 to 2 gms NaCl/g of $SiO_2$ to flocculate the sol.

In a further preferred form of the invention the pH is reduced to 4 or below.

The preferred single pass drying process is spray drying.

DETAILED DESCRIPTION OF THE INVENTION

FIG. 1 shows two key process parameters which affect the product; namely the percentage of $SiO_2$ in the sol and the degree of neutralisation of the alkali metal silicate. The numbered points in areas A and B indicate examples of the invention and the other points indicate experiments and both sets relate to Table I.

The products of this invention can also be made by feeding the reactants to a tube reactor the conditions of degree of neutralisation, $SiO_2$ content and the like being as previously defined.

The unmilled silica provided by this invention is particularly useful as a reinforcer in silicone rubbers and as an anti-blocking silica for use with plastics films. This silica can also be used after milling to impart thixotropic properties to resinous compositions, paints and the like.

The various parameters employed in defining the silica provided by this invention and in the processes for its manufacture are themselves defined or calculated as follows.

IGNITION WEIGHT LOSS

Ignition weight loss was measured by pre-drying samples at 120°C to constant weight and then determining the weight loss when the pre-dried samples were heated to 1000°C.

ULTRASONIC ENERGY STRENGTH TEST DEFINITION

Particle size distributions in the ultrasonic energy breakdown test were determined with a model T Coulter Counter, supplied by Coulter Electronics Limited, Dunstable, Bedfordshire, England. The silica sample for testing was dispersed at a concentration of 0.5 g/liter at a pH of 3–4 in Isoton which is a 1% saline solution containing 0.1% sodium azide supplied by Coulter Electronics. Ultrasonic energy was then applied to this dispersion using a Soniprobe Type 1130A sold by Dawe Instruments Limited of Western Avenue, Acton, London, England. The instrument used has a cylindrical probe of diameter 0.5 ins (1.27 cms). The probe was used in 100 ml of the silica dispersion carried in a 150 beaker (A) of internal diameter 5.8 cms, the probe extending 3.2 cms under the surface of the dispersion. The amount of ultrasonic energy applied to the dispersion was controlled both by discrete power settings on the ultrasonic generator and by the time over which the power was applied.

In the ultrasonic breakdown test, the work done on a silica dispersion by application of an amount of ultrasonic energy, was defined in joules calculated from the temperature rise observed when an equal amount of ultrasonic energy was applied to the vessel (A) suitably lagged and containing a volume of water equivalent to that of the silica dispersion used in the test (100 ml). This calibration was carried out over a period during wich the time/temperature curve was rectilinear.

Following application of the required amount of work to the dispersion, 1 ml was removed and added to 100 ml of Isoton to provide the final dispersion for analysis with the Coulter Counter.

The Coulter Counter was used with a 140 $\mu$ tube and particles were counted in each case for a fixed time of 50 secs. The following description of the procedure is given with reference to Table A which contains the basic Coulter Counter data from a breakdown test carried out on Example 8 from Table I. For a given sample of silica, the total oversize volume count (TVC) is first determined for that silica, using a dispersion which has received no ultrasonic work. The TVC is the cumulative oversize volume count over all the particle size ranges covered by the particular Coulter tube being used. In this case the range is 2–50 $\mu$ and it is essential that the sample used to determine the TVC has all particles within this range. For the purpose of the test, the sample must have a weight mean particle size on a substantially unimodial distribution in the range 9–20 $\mu$ with no particles greater than 40 $\mu$ or less than 3 $\mu$. Thus in Table A the data obtained in determining the TVC for Example 8 is given in column A, the TVC is equal to 107 and the weight mean particle size which is that size corresponding to one half of the TVC (53.5) is found graphically to be 14.5 $\mu$.

Table A

Data from Ultrasonic Breakdown Test on Example 8
Cumulative Oversize Volume Counts
Obtained from Coulter Counter

| Channel | Size ($\mu$) | A | B | C |
|---|---|---|---|---|
| 0 | 50.8 | 0 | 0 | 0 |
| 1 | 40.3 | 0 | 3 | 1 |
| 2 | 32.0 | 1 | 3 | 1 |
| 3 | 25.4 | 2 | 3 | 1 |
| 4 | 20.2 | 10 | 7 | 2 |
| 5 | 16.0 | 38 | 21 | 4 |
| 6 | 12.7 | 68 | 41 | 9 |
| 7 | 10.08 | 87 | 57 | 15 |
| 8 | 8.00 | 98 | 68 | 21 |
| 9 | 6.35 | 104 | 74 | 27 |
| 10 | 5.04 | 106 | 79 | 32 |
| 11 | 4.00 | 107 | 82 | 38 |
| 12 | 3.17 | 107 | 84 | 43 |
| 13 | 2.52 | 107 | 86 | 48 |
| 14 | 2.00 | 107 | 88 | 53 |

A - no ultrasonic work

WMPS 14.5 $\mu$

Table A-continued

Data from Ultrasonic Breakdown Test on Example 8
Cumulative Oversize Volume Counts
Obtained from Coulter Counter

| Channel | Size (μ) | A | B | C |
|---|---|---|---|---|
| B - ultrasonic work done on sample = 550 joules | | | 10.6 μ | |
| C - ultrasonic work done on sample = 1200 joules | | | | 2.0 μ |

The value of the weight mean particle size (WMPS) for any silica dispersion which has been subjected to ultrasonic work, is defined as that size for which the oversize volume count is equal to one half of the TVC of the control sample, i.e. the sample not subjected to ultrasonic work. Referring to Table A, the TVC for Example 8 is obtained from column A and is equal to 107. The WMPS for samples in columns B and C is that size for which the oversize volume count is one half of the TVC from column A, i.e. 53.5. By inspection, it is seen that the WMPS for column B lies between 10.08 μ and 12.7 μ. However, it is usual to determine the value of WMPS graphically from a plot of cumulative volume count against size. Thus the WMPS for the sample in column B is found to be 10.6 μ, and for the column C it is 2.0 μ.

It is thus possible to construct a graph of WMPS as a function of the ultrasonic work done on the dispersion, and hence to determine the work necessary to reduce the WMPS of a particular silica sample to 3 μ.

WEIGHT MEAN PARTICLE SIZE AND PARTICLE SIZE DISTRIBUTION

Particle size distributions of the fluid energy milled silicas produced were obtained using a Joyce Loebl disc centrifuge obtained from Joyce Loebl & Company Limited, Gateshead, County Durham, England, combined with a suitable analytical method. Samples were prepared for analysis by stirring 2 to 2½ gms of silica into 50 ml of distilled water and adjusting the pH to 4 with dilute hydrochloric acid. The dispersion was made up to 100 ml with more water and then placed in an ultrasonic bath of the type used as a cleaning bath. Ultrasonic energy was then applied for 30 minutes to effect complete dispersion. Following this the dispersion was stirred continuously to maintain complete dispersion and removed as required. Particle size fractions were obtained from the Joyce Loebl centrifuge using the "Buffered Line Start" technique as described in the instruction manual supplied with the instrument. This technique splits each aliquot of original dispersion into two fractions containing, respectively, particles less than or greater than a size $d$, where $d$ given by the following equation:

$$T = \frac{6.299 \times 10^9 \zeta}{d^2 N^2 \Delta\rho} \log_{10} \frac{R_2}{R_1} \quad (X)$$

where:
$T$ = centrifuge time in minutes
$d$ = particle size in microns
$N$ = centrifuge speed in rpm
$\Delta\rho$ = density difference between sample and spin fluid in g/ml For the purpose of these measurements the value of 2.21 gms per cc was used in all cases for the density of the silica particles.
$\zeta$ = viscosity of spin fluid in poise
$R_1$ = starting radius of particles, determined by the volume of spin fluid used in the rotor
$R_2$ = radius to which a particle of size d settles under the given conditions from a radius $R_1$.

The silica content of both the original dispersion and of each fraction was determined by dissolving in hydrofluoric acid (5 ml 24% solution) and estimating the silicon content of the resulting solution by atomic absorption spectrometry.

By varying the parameters in equation (X) it is possible to obtain different values for $d$, and thus by carrying out a set of experiments it is possible to construct a particle size distribution curve for the silica sample.

PERFORMANCE INDEX

One valuable use for the silicas provided by this invention is as a thixotropic additive for use in polyester resins, mineral oils and the like. Before determining the performance index each sample of silica was fluid energy milled in a 4 inch (approximately 10.3 cms) air microniser supplied by Henry Kingston, Wheathamstead, St. Albans, Hertfordshire, England. The microniser is of the top feed bottom discharge type and contains 6 jets, each $78 \times 10^{-3}$ in. ($1.98 \times 10^{-1}$ cm) diameter, arranged to give an impingement circle of 2½ in. (6.35 cm) diameter. An air relief bag was mounted above the microniser to retain the fines. The microniser was operated with a grind pressure of 95 psi (6.65 kg/cm²) and draws air at a rate of 60–80 scfm (1.7–2.2 Sm³/min). The feed rate of silica to the microniser is 2–3 lbs (0.92–1.35 kg) per hour.

The "fines" fraction from the bag was mixed with the "coarse" fraction before testing.

Experimental work suggests that the rheological performance of which the performance index is an indication can most consistently be measured using a standardised material. A suitable material is a heavy mineral oil obtained from Plough Inc. (United Kingdom) Limited under the trade name NUJOL having the following properties:

| | |
|---|---|
| specific gravity | 0.880 to 0.900 at 60°F |
| saybolt viscosity | 360/390 at 100°F |

A silica sample was oven dried at 120°C to constant weight and then combined with NUJOL to give a dispersion of known weight percent silica. The dispersion was passed twice through a triple roll mill with gap setting between the rollers of 0.002 ins. (0.005 mm).

Rheological measurements on the milled sample were made on a Haake Rotoviscometer using the MV II cup and bob assembly thermostatted to 25°C. Measurements were taken after one minute at each shear rate starting at the lowest (2.7 sec⁻¹) and working upwards. Data were plotted out as shear stress against shear rate and the curve was extrapolated to zero shear rate to give the apparent yield stress of the system. For a given silica it was found that the plot of the apparent yield stress (in dyne cm⁻²) against the cube of the weight percent silica passes through the origin and is substantially rectilinear. The slope of the line is a measure of the ability of the silica to build a structure in the dispersion and is called hereinafter "the performance index".

The apparent yield stress measurements in polyester resin were carried out to determine the effectiveness of the precipitated silicas in direct comparison with known silicas. The polyester resin was a commercially available resin sold by SRL Limited, Speke, England (formerly Beck Koller Limited) as unfilled Gelcoat 55. The resin was essentially an unsaturated polyester resin solution in styrene containing 33% by weight styrene.

A great deal of work has been carried out to illustrate the difference which exist between the prior art processes and the products and processes of the present invention and to indicate the criticality of the various parameters involved in defining the product and process according to this invention.

For convenience, a general process involving various steps in a preferred process according to this invention will now be described in detail and in the following tables results of work pertinent to defining the invention will be set out, it being understood that the same basic apparatus and processing conditions have been used throughout except where otherwise stated.

A vessel provided with heating equipment and a stirrer was used as the reaction vessel. To this was added a pool of water, heated and maintained at the desired temperature to which was added sulphuric acid and sodium silicate solution at addition points above the pool of water and on opposite sides of the pool. The addition of the sulphuric acid and silicate was continued to an appropriate silica concentration and degree of neutralisation. Ageing stage 1 was taken here and then the alkali metal salt (generally sodium chloride) was added to flocculate the sol. A second ageing period may be provided after this salt addition. Subsequently, the remaining silicate is neutralised with more acid to a final pH. Optionally a further 3rd ageing period may next be included before the separation by filtration of the precipitated silica from the liquors. Precipitated silica is then spray dried in a spray dryer with an exit temperature of 230°C and milled to the appropriate degree of fineness. The temperature in the drying stage should never exceed 450°C and is preferably never above 350°C.

In Table I there are set out the results obtained from Examples of the invention (Examples 1–15) and Experiments 1–17 indicating results obtained from prior art processes and under conditions similar to, but not within, the scope of the products or processes of this invention.

TABLE I

| Example | Pool volume (liters) | Acid addition rate (ml/min) | Silicate addition rate (ml/min) | Ageing times (mins) for stages: 1 | 2 | 3 | Final neutralisation time (mins) | Final pH | Added electrolyte (gNaCl/gSiO$_2$) | % SiO$_2$ (g/100ml) | % degree of neutralisation | Temperature °C |
|---|---|---|---|---|---|---|---|---|---|---|---|---|
| 1 | 7.2 | 23(c) | 160(a) | 10 | 15 | 35 | 25 | 3.4 | 1:1 | 3.0 | 30 | 100 |
| 2 | 208 | 342(d) | 4210(b) | 0 | 0 | 32 | 28 | 3.8 | 1:1 | 3.0 | 40 | 100 |
| 3 | 201 | 980(d) | 4000(b) | 0 | 0 | 34 | 26 | 3.8 | 1:1 | 3.0 | 50 | 100 |
| 4 | 162 | 126(d) | 5000(b) | 0 | 0 | 33 | 27 | 3.7 | 1:1 | 4.25 | 50 | 100 |
| 5 | 111 | 126(d) | 5000(b) | 0 | 0 | 27 | 33 | 3.5 | 1:1 | 5.5 | 50 | 100 |
| 6 | 97 | 950(c) | 5000(b) | 0 | 0 | 33 | 23 | 2.4 | 1:1 | 6.0 | 55 | 100 |
| 7 | 76 | 985(c) | 4500(a) | 10 | 15 | 31 | 29 | 4.3 | 1:1 | 4.9 | 44 | 100 |
| 8 | 97 | 900(c) | 4500(a) | 0 | 0 | 30 | 30 | 4.3 | 1:1 | 4.0 | 40 | 100 |
| 9 | 140 | 780(c) | 4500(a) | 10 | 15 | 30 | 30 | 3.4 | 1:1 | 3.5 | 35 | 100 |
| 10 | 130 | 970(d) | 5000(b) | 0 | 0 | 32 | 28 | 3.8 | 1:1 | 5.0 | 40 | 100 |
| 11 | 10.8 | 24(c) | 229(a) | 0 | 0 | 0 | 30 | 3.4 | 0.4:1 | 3.0 | 20 | 100 |
| 12 | 7.2 | 38(c) | 200(a) | 0 | 0 | 0 | 30 | 3.4 | 1:1 | 3.5 | 35 | 90 |
| 13 | 7.2 | 38(c) | 200(a) | 0 | 0 | 0 | 30 | 6.0 | 1:1 | 3.5 | 35 | 100 |
| 14 | 14.4 | 14(c) | 143(a) | 10 | 15 | 30 | 30 | 3.4 | 1:1 | 1.5 | 20 | 100 |
| 15 | 14.4 | 33(c) | 179(a) | 0 | 0 | 0 | 30 | 3.4 | 1:1 | 2.0 | 35 | 100 |
| Experiment | | | | | | | | | | | | |
| 1 | Iler US | 2,731,326 | Example 11 | build up ratio = 1:1 | | | | | | | | |
| 2 | Iler US | 2,731,326 | Example 11 | build up ratio = 2:1 | | | | | | | | |
| 3 | Iler US | 2,731,326 | Example 14 | | | | | | | | | |
| 4 | 7.2 | 38(c) | 200(a) | 0 | 0 | 0 | 30 | 3.1 | 1:1 | 3.5 | 35 | 50 |
| 5 | 7.2 | 38(c) | 200(a) | 0 | 0 | 0 | 30 | 3.4 | 1:1 | 3.5 | 35 | 75 |
| 6 | 7.2 | 38(c) | 200(a) | 0 | 0 | 0 | 30 | 9.0 | 1:1 | 3.5 | 35 | 100 |
| 7 | 10.8 | 24(c) | 273(a) | 10 | 15 | 30 | 30 | 3.4 | 0 | 3.0 | 20 | 100 |
| 8 | 10.8 | 24(c) | 229(a) | 0 | 0 | 0 | 30 | 3.4 | ¼:1 | 3.0 | 20 | 100 |
| 9 | 7.2 | 107(c) | 356(a) | 10 | 15 | 35 | 25 | 3.0 | 1:1 | 4.5 | 60 | 100 |
| 10 | 7.2 | 131(c) | 375(a) | 10 | 15 | 35 | 25 | 3.4 | 1:1 | 4.5 | 70 | 100 |
| 11 | 4.3 | 224(c) | 494(a) | 10 | 15 | 35 | 25 | 3.4 | 1:1 | 5.5 | 90 | 100 |
| 12 | 75 | 1030(c) | 5000(b) | 0 | 0 | 33 | 27 | 3.8 | 1:1 | 7.0 | 55 | 100 |
| 13 | 43 | 510(c) | 4500(a) | 10 | 5 | 30 | 30 | 4.3 | 1:1 | 6.0 | 25 | 100 |
| 14 | 132 | 730(d) | 4878(b) | 0 | 0 | 30 | 30 | 3.8 | 1:1 | 5.0 | 30 | 100 |
| 15 | 7.2 | 24(c) | 260(a) | 10 | 15 | 35 | 25 | 3.3 | 1:1 | 4.2 | 18 | 100 |
| 16 | 10.8 | 36(c) | 137(a) | 0 | 0 | 0 | 30 | 3.4 | 1:1 | 2.0 | 50 | 100 |
| 17 | Iler US | 2,731,326 | Example 7 | build up ratio = 2:1 | | | | | | | | |

| Example | Weight loss 120°C–1000°C (%) | Starting WMPS for breakdown test (microns) | Work required to break down to 3μ (joules) | Weight % less than 0.2 μ | Performance index | Apparent yield stress in polyester resin at 4½% loading (dyne cm$^{-2}$) |
|---|---|---|---|---|---|---|
| 1 | 6.1 | 11.2 | 1450 | 49 | 8.4 | 380 |
| 2 | 5.4 | 16.6 | 1700 | 50 | 8.5 | |
| 3 | 5.7 | 18.0 | 3300 | 34 | 9.1 | |
| 4 | 5.0 | 13.9 | 4800 | — | 8.5 | |
| 5 | 5.8 | 13.1 | 4400 | 39 | 8.8 | |
| 6 | 5.1 | 14.1 | 4500 | 35 | 8.4 | |
| 7 | 5.5 | 12.4 | 1200 | 49 | 7.0 | |
| 8 | 5.5 | 14.5 | 1050 | 34 | 9.9 | 440 |
| 9 | 4.9 | 15.2 | 2000 | 58 | 11.2 | 475 |
| 10 | 6.3 | 16.0 | 2100 | 37 | 7.9 | |
| 11 | 5.2 | 16.0 | 1630 | 39 | 8.2 | |
| 12 | 5.5 | 16.2 | 4000 | 53 | 8.3 | |
| 13 | 6.1 | 17.2 | 2500 | 66 | 9.4 | |
| 14 | 5.7 | — | — | 51 | 8.8 | 220 |
| 15 | 5.0 | 16.3 | 6400 | 46 | 7.0 | |
| Experiment | | | | | | |
| 1 | 4.9 | — | — | 4 | 3.4 | 50 |

TABLE I-continued

| Example | Pool volume (liters) | Acid addition rate (ml/min) | Silicate addition rate (ml/min) | Ageing times (mins) for stages: 1 2 3 | Final neutralisation time (mins) | Final pH | Added electrolyte (gNaCl/gSiO₂) | % SiO₂ (g/100ml) | % degree of neutralisation | Temperature °C |
|---|---|---|---|---|---|---|---|---|---|---|
| 2 | | 4.1 | 8.5 | | 1700 | 8.5 | | 2.7 | 50 | |
| 3 | | 5.2 | 17.1 | | >6500 | 10.4 | | 3.4 | 20 | |
| 4 | | 5.9 | 16.0 | | >8000 | 6 | | 0.6 | 10 | |
| 5 | | 5.1 | 12.5 | | >8000 | 16 | | 5.3 | 140 | |
| 6 | | 6.2 | 18.2 | | >8000 | 13 | | 1.2 | | |
| 7 | | 6.4 | 16.0 | | >6500 | 12 | | 1.2 | 60 | |
| 8 | | 5.3 | 18.2 | | 8000 | — | | 5.5 | | |
| 9 | | 5.8 | 13.5 | | >10400 | 27 | | 4.6 | | |
| 10 | | 4.9 | 15.0 | | >6500 | 16 | | 2.4 | | |
| 11 | | 5.4 | 13.1 | | >6500 | 24 | | 3.9 | | |
| 12 | | 5.7 | 15.0 | | 2500 | 19 | | 6.7 | | |
| 13 | | 5.5 | — | | — | 8 | | 0.4 | 10 | |
| 14 | | 5.9 | 12.0 | | 1680 | 27 | | 5.6 | | |
| 15 | | 5.1 | 10.5 | | 6600 | 20 | | 3.1 | | |
| 16 | | 5.5 | 11.5 | | >8000 | 18 | | 2.9 | | |
| 17 | | 5.2 | 13.0 | | 8000 | 18 | | 3.0 | | |

(a) sodium silicate specific gravity = 1.10
    weight ratio SiO₂/Na₂O = 3.3:1
(b) sodium silicate specific gravity = 1.20
    weight ratio SiO₂/Na₂O = 3.3:1
(c) sulphuric acid specific gravity = 1.06
(d) sulphuric acid specific gravity = 1.12
(e) sulphuric acid specific gravity = 1.18

An indication of the critical nature of the drying step can be obtained from the following experiments. A sample of silica of Example 8 described with reference to Table I was taken and after a normal spray drying step with a gas inlet temperature of 315°C and an exit temperature of 230°C was re-slurried and re-circulated a second, third and fourth time through the spray dryer. The performance index was determined after each passage through the dryer and results obtained were as follows:

| Times through dryer | 1 | 2 | 3 | 4 |
|---|---|---|---|---|
| Performance index | 9.9 | 6.8 | 3.9 | 3.8 |

Examples 1–15 in Table I indicate processes in Area A of FIG. 1 and Examples 1–13 represent processes in the preferred Area B of FIG. 1. Examples 9 and 12 and Experiments 4 and 5 indicate the effect of temperature on the process. Examples 9 and 13 and Experiment 6 indicate the effects of the final pH on the product. Example 11 and Experiments 7 and 8 indicate the effect of the sodium chloride flocculant addition. Experiments 9–16 indicate the effect of working outside Area A in FIG. 1.

Comparisons with the product produced according to the Iler U.S. Pat. No. 2,731,326 are set out in Table II in which data are given in Examples 16, 17 and 18 of the first stage of one process according to this invention and Experiments 1 and 2 also referred to in Table I indicate the results using the Iler process.

The surface area is measured upto completion of neutralisation and this causes the time difference in Table II.

TABLE II

| | Pool volume (liters) | Acid addition rate (ml/min) | Silicate addition rate (ml/min) | Ageing times (mins) for stages: 1 2 3 | Final neutralisation time (min) | Final pH | % SiO₂ (w/v) (g/100ml) | % Degree of neutralisation | Temp °C | Added electrolyte g NaCl/g SiO₂ | Elapsed time during secondary silica precipitation (min) | Ratio sec. SiO₂ prim. SiO₂ | Surface area (m²/g) (a) (b) |
|---|---|---|---|---|---|---|---|---|---|---|---|---|---|
| Example 16 | 7.2 | 35 | 200 | 10 15 30 | 30 | 3.0 | 3.5 | 35 | 100 | 1:1 | 0<br>10<br>20<br>30 | "heel"<br>—<br>—<br>— | 289<br>193<br>228<br>284 |
| Example 17 | 7.2 | 19 | 154 | 10 15 30 | 30 | 2.6 | 3.0 | 25 | 100 | 1:1 | 0<br>10<br>20<br>30 | "heel"<br>—<br>—<br>— | 401 332<br>235 178<br>267 163<br>288 255 |
| Example 18 | 7.2 | 35 | 200 | 10 15 30 | 120 | 3.0 | 3.5 | 35 | 100 | 1:1 | 0<br>30<br>60<br>90<br>120 | "heel"<br>—<br>—<br>—<br>— | 349 272<br>249 189<br>192 161<br>147 143<br>230 212 |
| Experiment 2 | Iler US 2,731,326<br>Example 11 — build up ratio = 2.0<br>final neutralisation time = 90 mins | | | | | | | | | | 0<br>30<br>60<br>90 | "heel"<br>2/3:1<br>4/3:1<br>2:1 | 138<br>138<br>125<br>113 |
| Experiment 1 | Iler Us 2,731,326<br>Example 11 — build up ratio = 1.0<br>final neutralisation time = 60 mins | | | | | | | | | | 0<br>20<br>40<br>60 | "heel"<br>1/3:1<br>2/3:1<br>1:1 | 206<br>182<br>158<br>139 |

(1) preparation data  sodium silicate specific gravity = 1.10
    Examples 16, 17, 18

TABLE II-continued

| Pool volume (liters) | Acid addition rate (ml/min) | Silicate addition rate (ml/min) | Ageing times (mins) for stages: 1 2 3 | Final neutralisation time (min) | Final pH | % SiO₂ (w/v) (g/100ml) | % Degree of neutralisation | Temp °C | Added electrolyte g NaCl/g SiO₂ | Elapsed time during secondary silica precipitation(min) | Ratio sec. SiO₂ prim. SiO₂ | Surface area (m²/g) (a) (b) |
|---|---|---|---|---|---|---|---|---|---|---|---|---|

(2) surface area data weight ratio SiO₂/Na₂O = 3.3:1
sulphuric acid specific gravity = 1.06
(a) washed with demineralised water followed by water at a pH = 3.0
(b) wash with demineralised water only.

In Tables III and IV data are set out showing the difference between the products according to this invention and those disclosed in the Cabot Corporation British Pat. Specification No. 1,145,510. Table III indicates the viscosity at various shear rates using the silica of Example 8 set out in Table I, compared with the data disclosed by Cabot in BP1,145,510.

TABLE III

| | | Viscosity (cps) | |
|---|---|---|---|
| | | Example 8 | |
| Shear rate (sec⁻¹) | Cabot | Dispersed with Three Roll Mill | Dispersed with High Speed Stirrer |
| 16.2 | 985 | 2900 | 2400 |
| 32.3 | 570 | | |
| 48.5 | 415 | 1150 | 940 |
| 97.0 | 251 | | |
| 146 | 196 | 520 | 430 |
| 291 | 138 | | |
| 437 | 116 | 260 | 220 |
| 873 | 88 | | |
| 1310 | 78 | | |

Cabot data  4% silica in paraffin oil [viscosity = 38 cps] silica dispersed with high speed stirrer.

Example 8  4% silica in mixture of Nujol + dodecane (85:15) [giving a viscosity of 38 cps for the mixture].

Table IV indicates the effect of the Cabot silica compared with the silica of Example 8 in polyester resin compositions.

TABLE IV

Polyester Resin Data [Brookfield Viscometer]
Cabot Data from BP 1,145,510

2% micronised silica — dispersed in Waring Blendor —
resin viscosity — nominal 300 cps.

| | Viscosity | Relative Viscosity |
|---|---|---|
| 6 rpm | 1500 cps | 5.0 |
| 60 rpm | 720 cps | 2.4 |
| shear thinning index | | 2.08 |

Example 8
2% micronised silica — dispersed with three roll mill —
resin viscosity — 900 cps.

| | Viscosity | Relative Viscosity |
|---|---|---|
| 5 rpm | 6080 poise | 6.75 |
| 50 rpm | 2450 poise | 2.72 |

TABLE IV-continued

Polyester Resin Data [Brookfield Viscometer]
Cabot Data from BP 1,145,510

| shear thinning index | 2.5 |
|---|---|

From these two tables it will be seen that the silica of Example 8 is significantly more effective than that of the silica disclosed by Cabot.

A sample of the silica produced according to Example 8 was incorporated in a heat curing silicone rubber formulation and comparative data drawn against a fumed silica in a comparable formulation.

Certain of the physical properties of the rubber produced using the silica according to the present invention were not as good as those from the commercially available fumed silica which had a surface area of about 200 m²/g but it is thought that these particular features could well be improved by a more thorough washing as would occur on an industrial scale.

TABLE V

| | Cure | Hardness °BS | Tensile psi | Elongation % | Tear psi | Compression Set % |
|---|---|---|---|---|---|---|
| Silica of Example 8 | Press Cure only | 59 | 970 | 280 | 5.5 | 51.0 |
| | 4 hr at 200°C | 59 | 675 | 210 | 4.6 | 23.5 |
| | 24 hr at 250°C | 58 | 815 | 190 | 4.1 | 17.9 |
| Fumed Silica | Press Cure only | 53 | 1082 | 455 | 4.7 | 27.9 |
| | 4 hr at 200°C | 55 | 1110 | 400 | 5.8 | 14.0 |
| | 24 hr at 250°C | 56 | 983 | 330 | 6.6 | 13.1 |

The filler loading in each case was 37 parts filler as received per 100 parts silicone elastomer.

What is claimed is:
1. A precipitated silica having:
   a. an ignition weight loss of at least 3% between 120°C and 1000°C,
   b. a strength such that a sample of the silica having a weight mean particle size on a substantially unimodal distribution in the size range 10–20 microns requires less than 6500 joules of ultrasonic energy to reduce the weight mean particle size of the sample to below 3 microns, said sample comprising 0.05 grams of said silica in 100 ml. of a 1 percent aqueous saline solution containing 0.1 percent sodium azide, and
   c. after fluid energy milling, a rheological performance index of at least 7, said rheological performance index being determined by subjecting each of a plurality of samples of the milled silica dispersed in a heavy mineral oil (having a specific gravity of 0.880 to 0.900 at 60°F. and a Saybolt viscosity of 360/390 at 100°F.) to varying shear force rates to determine shear stress as a function of shear rate and to determine the apparent yield stress for the system comprising the silica dispersed in said heavy mineral oil, said samples containing a weight percent silica different from the weight percent silica in the other samples, and determining the slope of the line formed by plotting the apparent yield stress as a function of the cube of the weight percent silica in each of said samples, said slope defining the rheological performance index.

2. A milled precipitated silica having:
a. an ignition weight loss of at least 3% between 120°C. and 1000°C.,
b. a particle size distribution such that at least 30% by weight is less than 0.2 microns, and
c. a rheological performance index of at least 7, said rheological performance index being determined by subjecting each of a plurality of samples of the milled silica dispersed in a heavy mineral oil (having a specific gravity of 0.880 to 0.900 at 60°F. and a Saybolt viscosity of 360/390 at 100°F.) to varying shear force rates to determine shear stress as a function of shear rate and to determine the apparent yield stress for the system comprising the silica dispersed in said heavy mineral oil, said samples containing a weight percent silica different from the weight percent silica in the other samples, and determining the slope of the line formed by plotting the apparent yield stress as a function of the cube of the weight percent silica in each of said samples said slope defining the rheological performance index.

\* \* \* \* \*